United States Patent [19]
Poster

[11] 3,779,648
[45] Dec. 18, 1973

[54] HYDROPHILIC LENS HOLDER

[76] Inventor: Maurice G. Poster, 108 Columbia Dr., Jericho, N.Y. 11753

[22] Filed: Feb. 16, 1972

[21] Appl. No.: 226,838

[52] U.S. Cl. .............................. 356/124, 356/246
[51] Int. Cl. ........................................... G01b 9/00
[58] Field of Search ............ 356/246, 244, 124–127; 350/94, 95, 312

[56] References Cited
UNITED STATES PATENTS

| | | | |
|---|---|---|---|
| 2,221,944 | 11/1940 | Goddard | 350/312 |
| 2,632,045 | 3/1953 | Sziklai | 350/312 |
| 3,266,967 | 8/1966 | Saunders | 356/246 |
| 3,363,503 | 1/1968 | Shifrin | 356/246 |

*Primary Examiner*—William L. Sikes
*Attorney*—Fidelman, Wolffe, Leitner and Hiney

[57] ABSTRACT

A lens holder including a "V" or "U" shaped support member mounted between two transparent plates, said support being so sized as to be capable of supporting without deformation a hydrophilic contact lens and forming, with the transparent plates, a container for saline solution. In use, the hydrophilic lens is placed on the support and hydrated in an appropriate solution where the measurements with conventional equipment may be conducted.

2 Claims, 2 Drawing Figures

PATENTED DEC 18 1973 3,779,648

HYDROPHILIC LENS HOLDER

BACKGROUND OF THE INVENTION

The present invention relates generally to lens holders for optical test equipment, and methods of testing and more particularly to a holder for hydrophilic lenses and test solution to be used with optical test equipment.

DESCRIPTION OF THE PRIOR ART

In the field of eye contact lens holders, there are a variety of holders for use with test equipment. Most of these holders involve some sort of structural support for the lenses. Other types of holders try to minimize deformation of the lens by various types of soft seating materials. These have included such materials as clay, toothpaste and water, to name just a few. An example of a water seat to support a lens and thus aleviate distortion of the surface of the lens is the Wesley et al. patent, U.S. Pat. No. 3,027,804 dated Apr. 3, 1962.

Though the prior art includes many techniques to support lenses in lens testing equipment, none of these devices have been practically used with hydrophilic lenses. The major problem with hydrophilic lenses are the measurement of their physical parameters while in the hydrated states. Since these lenses are hydrated in use, the measurement in the hydrated state is the more accurate and thus the most desirable.

Hydrophilic lenses may vary from 20 to 80 percent hydration. With this type of lens in the hydrated state, they are very soft and have little, if any, structural rigidity. The conventional lens holder will not support a hydrated hydrophilic lens without serious deformation. The measurement of any optical parameter is impossible.

Presently the power of hydrophilic lenses are measured, if possible, while in the dry state and mathematically calculated for the wet state. Another popular method is to check the lenses in a lensometer while dehydrating. This technique is inaccurate since it is difficult to determine the stage of dehydration, and therefore makes a calculation of the power in the totally hydrated or wet state difficult.

Unfortunately there are varying degrees of hydration, whether due to different batches of the material, due to atmospheric conditions affecting the materials during manufacture, due to changes in refractive index of different materials, or to a host of other reasons. These problems make it difficult to determine the power of the lens in the one state and try to extrapolate this information to the preferred wet state.

The method and apparatus to be described is one which makes measuring more convenient and reliable as well as determining the power of the lens in the condition that the lens will be worn, i.e., hydrated state.

SUMMARY OF THE INVENTION

The invention is basically a holder for hydrating a hydrophilic lens and holding such lens without distortions or aberrations for use in available optical test equipment. The holder consists of a U or V-shaped support member mounted between two plano transparent plates. The interior of said U or V-shaped support member and the two transparent plates form a liquid-tight container for supporting and hydrating a hydrophilic lens. The U or V-shaped member is filled with hydrating solution, preferably a saline solution. The lens is inserted in the holder to be hydrated and supported therein. The holder is then placed in any conventional optical tester to test the undistorted lens in the hydrated state.

The holder may consist of a single U or V-shaped support means or two or more such support means for holding, for example, a pair of hydrophilic lenses belonging to a single user for tests. A reticle scale may be added to one of the transparent plates so that one can measure the diameter, OZ's, lenticulars, etc. The holder may also be adapted with a lid to prevent contamination or foreign objects from entering the saline solution during test conditions.

OBJECTS OF THE INVENTION

An object of the present invention is to provide a holder for hydrophilic lenses to allow optical testing in the hydrated state.

Another object of the invention is to provide a holder for optical testing of hydrophilic lenses which does not require removal of or substitution for existing parts of equipment currently in use.

A further object of the invention is to provide a holder so as to minimize or eliminate the effect of distortion and warping of the lens due to holding pressure.

Still another object of the invention is to provide a holder for a pair of hydrophilic lenses so that they may be tested in the hydrated state.

A still further object is to provide a lens holder which is of simple unitary structure and low in cost while promoting accuracy in the measurement of a power of such lenses.

An even further object is to provide a method for testing a hydrophilic lens in the hydrated state.

Another object is to provide a method for hydrating and supporting a hydrophilic lens without deformation of the lens.

Other objects, advantages, and novel features of the present invention will become apparent from the detailed description of the invention when considered in conjunction with the accompanying drawings.

DESCRIPTION OF THE PREFERRED EMBODIMENTS

Figure 1:
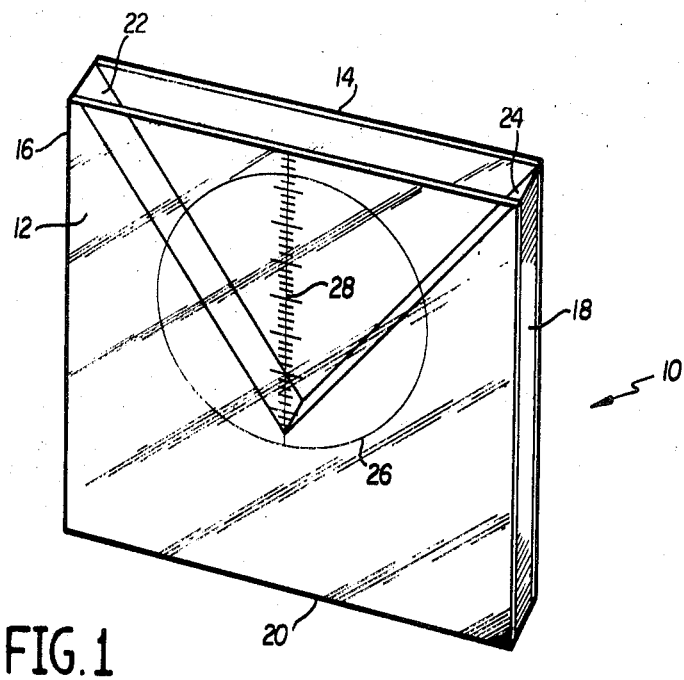
FIG. 1 is a perspective view of a V-shaped hydrophilic lens holder.

FIG. 1, which illustrates one of the preferred embodiments of the hydrophilic lens holder, shows a basic V-shaped holder 10. Two transparent plates 12 and 14 are mounted to a V-shaped support member. The V-shaped support member has interior V-shaped walls 22 and 24 and exterior sides 16, 18 and 20. The walls 22 and 24 form a 90° angle. This angle provides distortionless support while minimizing the amount of solution needed to hydrate the lens.

The transparent plates 12 and 14 may be made of two planar gas 35 mm film covers or any other appropriate transparent planar elements. The thickness of the V-shaped support member is approximately one-fourth inch since the dome height of the presently used hydrophilic lens is approximately three-sixteenths of an inch. Any other dimension is possible which will allow easy insertion of the lens to be tested while preventing misalignment of the lens axes. This V-shaped member may be made of plastic or any other non-toxic materials.

As shown in FIG. 1, a reticle 26 may be added with scale 28 in the center of the V slot member so that one can measure the diameter, OZ's, lenticulars, etc. A top or other type of lid may be provided for the holder and prevent contamination or foreign objects from falling into the V-shaped cavity.

To prepare the holder for use, the V-shaped member is normally filled with saline solution and the hydrophilic lens is placed in the chamber. Though saline is presently used with hydrophilic lenses, any other approved non-contaminating hydrating solution may be used. It now becoms simple to place the holder in the angled lensometer and obtain a clear sharp focus of the target of the lensometer as with glass lenses.

Due to the change in index surrounding the lenses, the dioptral power reading of the lensometer must be converted back to the dioptral power in air, which is the usual terminology in the ophthalmic field. A simple method is to multiply the lensometer reading by four, assuming the index of the material to be approximately 1.43. Although four is not exact, it is close enough for clinical purposes. By enlarging the dioptral dial of the lensometer you can increase the increments so that you can obtain readings necessary for lenses checked in this fashion. The same holder may also be used to inspect the lenses in a shadowgraph instrument, using the preferred embodiment holder in place of the conventional holder.

Figure 2:
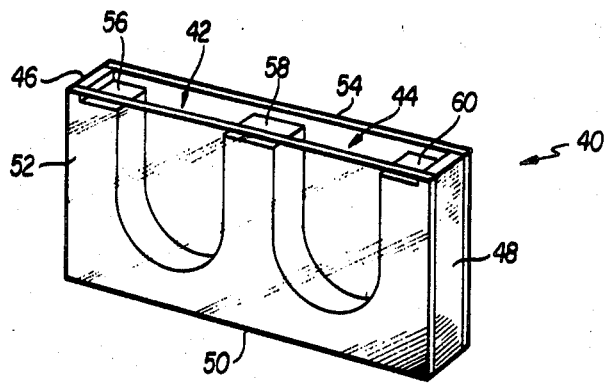
FIG. 2 is a perspective view of a U-shaped holder for a pair of hydrophilic lenses.

FIG. 2 shows another embodiment of the present hydrophilic lens holder using a U-shaped support member. This embodiment also shows a holder using a pair of support members to accommodate a pair of lenses from a single user. The basic holder 40 consists, as in FIG. 1, of two transparent plates 52 and 54. Between these plates is a plastic support member having two U-shaped supports 42 and 44. The radius of the curvature of the bottom of the "U" member is slightly larger than the radius of the lens to be inserted.

The exterior walls of the support member, 46, 48 and 50, are of the same dimension and mate with the two transparent plates. The top of the support members, 56, 58 and 60 are recessed or are shorter in height than the two transparent plates. The area defined by tops 56, 58 and 60 and the extension of the two transparent plates 52 and 54 and the two side walls 46 and 48 form a convenient holder for a top or cap member. Said top is inserted and held in place in this defined rectangular area. The embodiment of FIG. 2 provides the optimum support for the soft hydrophilic lens. The U-shaped support maximizes contact with the lens and thus distributes the weight. This minimizes the amount of lens deformation while in the holder.

As with the embodiment of FIG. 1, FIG. 2 may be made of a variety of materials, and have a variety of dimensions to accommodate the dimensions of the lens to be tested. Though a factor of four was used to convert the dioptral power reading of the lensometer, an appropriate conversion factor may be calculated for any change in the materials used in the construction of the holder. These calculations are well known in the art, and are based on the index of refraction of the wall plates, the hydrating solution and the lens.

From the foregoing description it will be seen that there is provided a simple, unitary hydrophilic lens holder for hydrating and supporting the lens without deformation for use with optical testing equipment. The support member may be of various configurations and be made of any non-toxic materials. Also evident is a method for testing a hydrophilic lens by supporting and hydrating the lens in a U or V-shaped holder containing saline solution and inserting said holder in the conventional optical test equipment.

Obviously, many modifications and variations of the present invention are possible in light of the above teachings. It is therefore to be understood that, within the scope of the appended claims, the invention may be practiced otherwise than as specifically described.

What is claimed is:

1. A method for testing a hydrophilic lens comprising:
   a. supporting said lens without distortion between a pair of parallel transparent plates spaced about one-fourth inch apart on a U-shaped or V-shaped supporting means, said plates and supporting means forming a fluid and lens holding container,
   b. simultaneously with said supporting, continuously hydrating said lens with a solution in said container by completely immersing said lens in said solution,
   c. placing said holder in an optical tester for testing, and
   d. testing said lens with said optical tester.

2. The method of claim 1 wherein said plates supporting said lens without distortion are plano glass 35mm film covers.

* * * * *